United States Patent
Brill et al.

(10) Patent No.: US 9,807,193 B2
(45) Date of Patent: Oct. 31, 2017

(54) DYNAMIC NEW USER EXPERIENCE (NUX)

(75) Inventors: Jacob Andrew Brill, San Francisco, CA (US); Neel Ishwar Murarka, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 401 days.

(21) Appl. No.: 13/566,843

(22) Filed: Aug. 3, 2012

(65) Prior Publication Data

US 2014/0040366 A1 Feb. 6, 2014

(51) Int. Cl.
*G06F 15/16* (2006.01)
*H04L 29/08* (2006.01)
*G06Q 50/00* (2012.01)

(52) U.S. Cl.
CPC ........... *H04L 67/306* (2013.01); *G06Q 50/01* (2013.01); *H04L 67/303* (2013.01)

(58) Field of Classification Search
CPC ..................................................... H04L 67/306
USPC ......................................................... 709/204
See application file for complete search history.

(56) References Cited

U.S. PATENT DOCUMENTS

| | | | | |
|---|---|---|---|---|
| 2007/0255807 A1* | 11/2007 | Hayashi | .................. | H04L 12/58 709/219 |
| 2008/0305815 A1* | 12/2008 | McDonough | ....... | H04L 12/5895 455/466 |
| 2009/0240564 A1* | 9/2009 | Boerries | ............ | G06Q 30/0255 709/204 |
| 2012/0130823 A1* | 5/2012 | Levin | ......................... | 705/14.69 |
| 2012/0271883 A1* | 10/2012 | Montoya | ............... | H04W 4/023 709/204 |
| 2013/0132484 A1* | 5/2013 | Berezecki | ...................... | 709/205 |
| 2015/0317398 A1* | 11/2015 | Phillips | ............. | G06F 17/30867 707/734 |

* cited by examiner

*Primary Examiner* — Wing F Chan
*Assistant Examiner* — Andrew Woo
(74) *Attorney, Agent, or Firm* — Baker Botts L.L.P.

(57) ABSTRACT

In one embodiment, a method includes receiving from a mobile device of a user configuration data of the mobile device. The configuration data identifies one or more characteristics of the mobile device. The method also includes determining a group of users of the social-networking system based at least in part on the configuration data. Each user in the group of users uses a mobile device having similar configuration data as the mobile device of the user. The method also includes providing user-assistance information associated with the group of users to the user.

17 Claims, 5 Drawing Sheets

DYNAMIC NEW USER EXPERIENCE (NUX)

TECHNICAL FIELD

This disclosure generally relates to new user experience.

BACKGROUND

A mobile electronic device, such as a smartphone, tablet device, laptop computer, etc., has general computing capabilities. The mobile electronic device may execute one or more applications such as for example, communications through short-message service (SMS), communications through multimedia-messaging service (MMS), accessing e-mail, accessing Internet content, communications through a short-range wireless (e.g. infrared or BLUETOOTH), business applications, gaming, or photography using a camera integrated into the mobile electronic device. A smartphone is a particular class of mobile electronic device with telephony capabilities provided through a radio-frequency (RF) communication link whilst moving within a geographic area. The smartphone may have a touch sensor integrated with a display screen, where the touch sensor detects touch inputs and the display screen displays content. The smartphone connects to a cellular network for access to the public telephone network and Internet content.

DESCRIPTION OF EXAMPLE EMBODIMENTS

Figure 1:
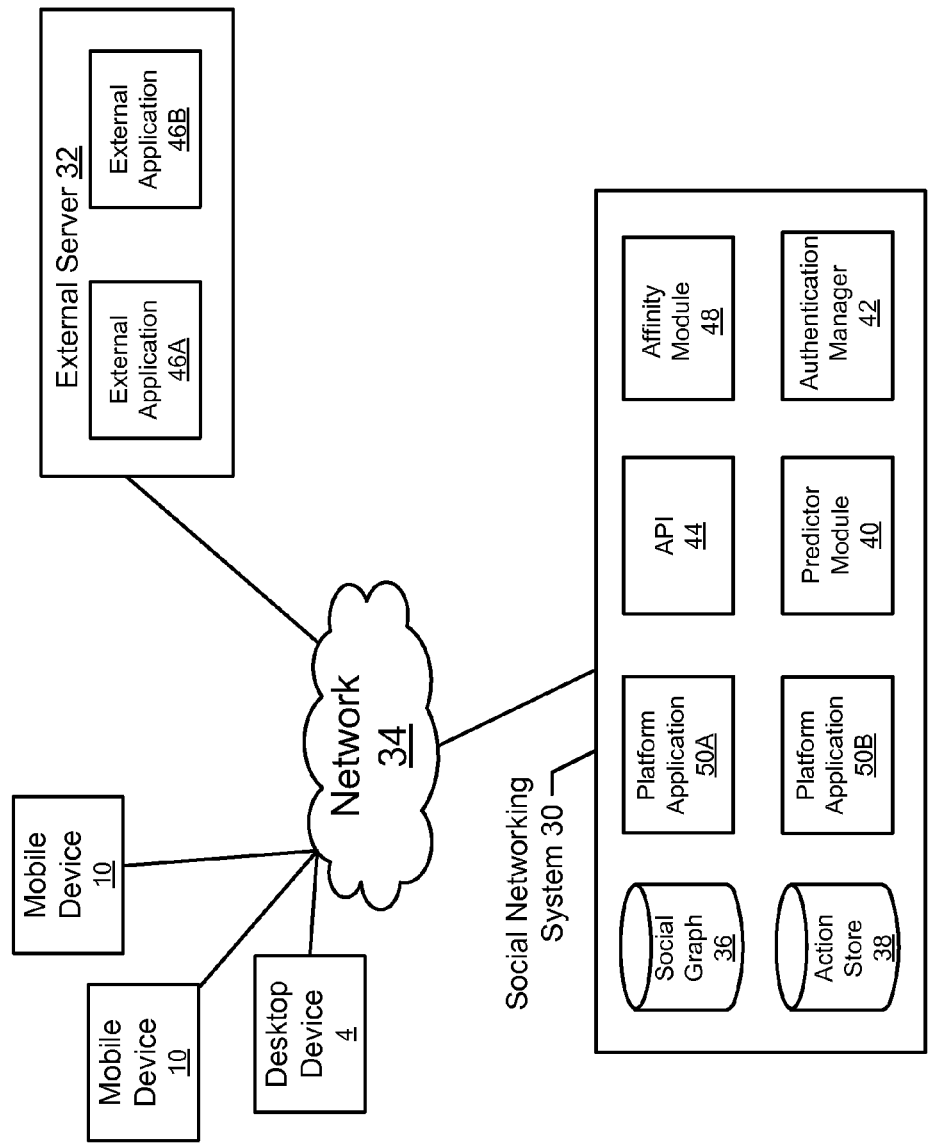
FIG. 1 illustrates an example social-networking system.

FIG. 1 illustrates an example social-networking system. In the example of FIG. 1, a social-networking system 30 and an external server 32 are coupled through a network 34. Network 34 generally represents a network or collection of networks (such as for example the Internet, a corporate intranet, a virtual private network (VPN), a local-area network (LAN), a wireless local-area network (WLAN), a cellular network, a wide-area network (WAN), a metropolitan-area network (MAN), or a combination of two or more such networks) over which social-networking system 30 or external server 32 may communicate with a desktop computing device 4 and a mobile device 10. Although this disclosure describes and illustrates a user experience (UX) for a particular online service, this disclosure contemplates an UX for any suitable online service or portal, such as for example a social network, a search engine, a financial portal, or a news portal.

A user may interact with social-networking system 30 using desktop device 4 or mobile device 10. Desktop computing device 4 and mobile device 10 may communicate with social-networking system 30 via an application such as a web browser or native application executed on processor of desktop computing device 4 or mobile device 10. As an example and not by way of limitation, interactions between mobile device 10 and social-networking system 30 may include viewing profiles of other users of social-networking system 30, contributing and interacting with media items, joining groups, listing and confirming attendance at events, checking in at locations, liking certain pages, creating pages, and performing other tasks that facilitate social interaction. Although this disclosure describes and illustrates particular interactions between particular devices and the example social-networking system, this disclosure contemplates any suitable interactions between any suitable devices and any suitable system.

In particular embodiments, an online service may be hosted by social-networking system 30 and the online service may provide user-assistance information that may include data identifying groups or communities of users, tips about features, or tutorials showing how to use social-networking system 30. In particular embodiments, social-networking system 30 may dynamically configure the UX associated with the online service based at least in part on information associated with the user, mobile device 10, or any combination thereof. The UX may include user-assistance information provided to the user though communications between the online service and mobile device 10 or a desktop computing device 4, such as for example through e-mail, presenting data on a display of mobile device 10 or desktop computing device 4, short message service (SMS) messages to mobile device 10, an instant message (IM) to desktop computing device 4, or any other suitable communication between social-networking system 30 and mobile device 10 or desktop computing device 4. In particular embodiments, the user-assistance information may be dynamically configured independent of the computing platform used to access the online service and presented to the user. As an example and not by way of limitation, social-networking system 30 may display top questions associated with mobile device 10 of the user even when the user accesses social-networking system 30 through desktop computing device 4.

A computing system of social-networking system 30 may receive configuration data identifying one or more characteristic of mobile device 10. As an example and not by way of limitation, the configuration data may include data identifying the manufacturer of mobile device 10 (e.g. APPLE or HTC), the model of mobile device 10 (e.g. IPHONE 4S or SAMSUNG GALAXY S III), the operating system (OS) of mobile device 10 (e.g. IOS or ANDROID), or the version of the OS (e.g. IOS 5 or ANDROID 4 ("ICE CREAM SANDWICH")). In particular embodiments, the configuration data may be provided manually to social-networking system 30 by the user. In other particular embodiments, the configuration data may be provided to social-networking system 30 through a user agent or trusted platform module. As an example and not by way of limitation, the user agent may be part of an application supported by social-networking system 30 that transmits a string containing the configuration data. Although this disclosure describes particular methods for providing the configuration data to the social-networking system, this disclosure contemplates any suitable method for providing the configuration data to the social-networking system.

The content of user-assistance information of the UX may selected based at least in part to the configuration data of mobile device 10. As an example and not by way of limitation, the user-assistance information of social-networking system 30 may provide user-assistance information that directs the user of mobile device 10 to a group or community of users using a mobile device having substantially similar configuration data to mobile device 10 of the user. The user-assistance information may direct to the user to a community of users that use an IPHONE 3 in response to social-networking system 30 determining the user is using an IPHONE 3. As another example, social-networking system 30 may e-mail the user of mobile device 10 one or more tips on how to use features of the online service, such as for example how to upload a photo to social-networking system 30 using the particular mobile device type of the user, such as for example an IPHONE 3. In particular embodiments, the content of the user-assistance information, e.g. top questions, tips, or communities, may be updated in response to a change in the configuration data of mobile device 10. As an example and not by way of limitation, the user may be directed to a different user community in response to social-networking system 30 determining mobile device 10 has a change of configuration data, such as for example the configuration data changing from an IPHONE 3 to an IPHONE 4S.

The content of the user-assistance information may be selected by social-networking system 30 based at least in part on one or more users in social graph 36 that use a mobile device having substantially similar configuration data. In particular embodiments, the user-assistance information may direct the user to a community of users that in social graph 36 of the user. As an example and not by way of limitation, social-networking system 30 may direct the user to a community of users in social graph 36 of the user that use a mobile device having substantially similar configuration data with mobile device 10 of the user. In particular embodiments, the user-assistance information provided by social-networking system 30 may include one or more names or images of users (e.g. as a "facepile") in social graph 36 that are members of the group. As another example, social-networking system 30 may provide user-assistance information that may include one or more tips previously accessed by users in social graph 36 that use a mobile device having substantially similar configuration data as mobile device 10 of the user. Although this disclosure describes particular types of user-assistance information, this disclosure contemplates any suitable type of user-assistance information. Moreover, this disclosure contemplates selecting the content of the user-assistance information based on any suitable social context of the user, such as for example the geographic location of users in social graph 36.

The user may perform an initial registration of mobile device 10 with the online service or perform an initial account set-up for the online service. In particular embodiments, the computing system of social-networking system 30 may receive the configuration data of mobile device 10 of the user during initial registration of mobile device 10 with the online service or during initial account set-up if performed through mobile device 10. The online service may provide user-assistance information as part of a new user experience (NUX). In particular embodiments, the NUX of the online service may provide user-assistance information upon completion of the registration procedure. As an example and not by way of limitation, the user-assistance information may provide a tip on performing a status update using a mobile device having substantially similar configuration data as mobile device 10. As another example, the NUX may provide a tutorial directed toward using the online service for users with a mobile device having substantially similar configuration data as mobile device 10.

Social-networking system 30 includes one or more computing systems, described below, with components used to store information about users and objects represented in the social networking environment and relationships among the users and objects. The social-networking system 30 may include components enabling interactions with desktop computing device 4 or mobile device 10, as described below. Components of social-networking system 30 may be hosted on one or more servers. This disclosure contemplates any suitable servers, such as servers that are internal to social-networking system 30 or external servers 32. As an example and not by way of limitation, one or more servers may each include one or more advertising servers, applications servers, catalog servers, communications servers, database servers, exchange servers, fax servers, file servers, game servers, home servers, mail servers, message servers, news servers, name or domain-name servers (DNS), print servers, proxy servers, sound servers, standalone servers, web servers, or web-feed servers. In particular embodiments, a server includes hardware, software, or both for providing the functionality of the server. As an example and not by way of limitation, a server that operates as a web server may be capable of hosting websites containing web pages or elements of web pages and include appropriate hardware, software, or both for doing so. In particular embodiments, a web server may host Hyper Text Markup Language (HTML) or other suitable files or dynamically create or constitute files for web pages on request. In response to a Hyper Text Transfer Protocol (HTTP) or other request from shared device 4 or mobile device 10, the web server may communicate one or more such files to mobile device 10. As another example, a server that operates as a database server may be capable of providing an interface for interacting with one or more data stores (such as, for example, action store 38 described below). Where appropriate, a server may include one or more servers; be unitary or distributed; span multiple locations; span multiple machines; span multiple datacenters; or reside in a cloud, which may include one or more cloud components in one or more networks.

A social graph 36 of social-networking system 30 stores the connections each user has with other users of social-networking system 30. In particular embodiments, social graph 36 may also store second-order connections. The connections may thus be direct or indirect. As an example and not by way of limitation, if user A is a first-order connection of user B but not of user C, and B is a first-order connection of C, then C is a second-order connection of A on social graph 36. An action store 38 stores actions that have been performed by the users of social-networking system 30, along with an indication of the time associated with those actions and references to any objects related to the actions. Action store 38 may store statistics for specified categories of actions. As an example and not by way of limitation, for a given user, action store 38 may contain a number of stories posted in 30 days by a user, a number of photos posted by the user in 30 days, or a number of distinct users that received comments of the user within the past 30 days. For a given connection between two users, user A and user B, action store 38 may contain actions such as the number of profile page views from user A to user B, the number of photo page views from user A to user B, and the number of times user A and user B were tagged in the same photo, and these actions may be associated with a timestamp or may be filtered by a cutoff (e.g., 24 hours, 90 days, etc.). The actions recorded in action store 38 may be farmed actions, which are performed by a user in response to the social-networking system 30 providing suggested choices of actions to the user.

A predictor module 40 is responsible for computing a set predictor functions that predict whether a user will perform a set of corresponding actions. Each predictor function may be representative of a user's interest in a particular action associated with the predictor function. The historical activity of a user may be used as a signal of a user's future interest in the same activity. In particular embodiments, the predictor function is generated using a machine-learned algorithm, that is trained using a user's historical activity associated with an action. Predictor module 40 thus provides a predictor function for each of a set of actions, where a predictor function may take as an input the a user's historical activity and then outputs a measure of the likelihood that the user will engage in the corresponding activity.

An authentication manager 42 may allow users to log into social-networking system 30 from mobile device 10 or desktop computing device 4 through an application supporting social-networking system 30. An application programming interface (API) 44 works in conjunction with authentication manager 40 to validate users via external applications 46A-B stored on external server 32. In particular embodiments, authentication manager 42 in conjunction with API 44 may periodically verify account information of the user.

An affinity module 48 provides a measure of affinity based on input data about the user from the social-networking system 30 using the predictor functions. Various processes may request a measure of affinity from affinity module 48. As an example and not by way of limitation, the processes may include basic social-networking system functionality, such as for example newsfeed algorithms, advertising-targeting algorithms, or friend-suggestion algorithms. Other processes that request measures of affinity may be executed by one or more platform applications 50A-B, which are applications that operate within the social-networking system 30 but may be provided by third parties other than an operator of the social-networking system 30. Platform applications 50A-B may include social games, messaging services, or any suitable application that uses the social platform provided by social-networking system 30.

In particular embodiments, the processes requesting a measure of affinity for a user may include one or more external applications 46A-B executed on external server 32. External applications 46A-B may interact with the social-networking system 30 via API 44. External applications 46A-B can perform various operations supported by the API 44, such as enabling users to send each other messages or SMS messages through social-networking system 30 or showing advertisements routed through social-networking system 30. Herein, reference to SMS messages encompasses messages in text and other forms of content, such as for example, images or links to web content. Although this disclosure describes and illustrates a particular social-networking system having a particular configuration of particular components, this disclosure contemplates a social-networking system having any suitable configuration of any suitable components.

Figure 2:
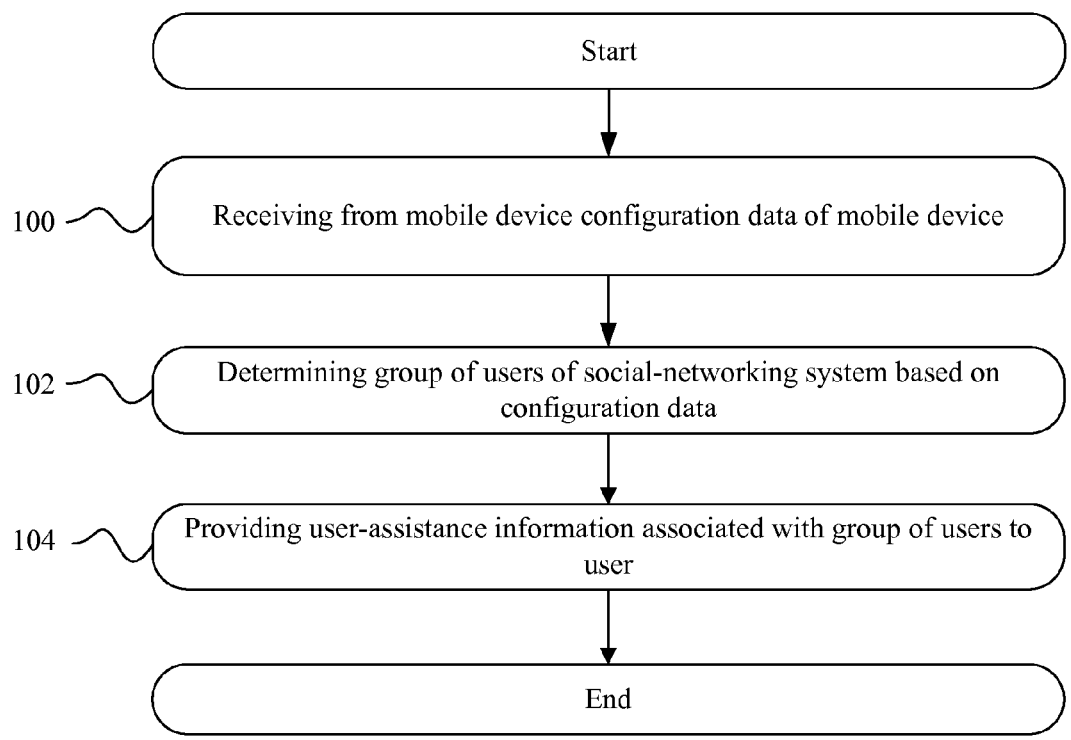
FIG. 2 illustrates an example method for providing user-assistance information to a user of a mobile device.

FIG. 2 illustrates an example method for providing user-assistance information to a user of a mobile device. The method may start at step 100, where a computing system of a social-networking system receives from a mobile device of a user configuration data of the mobile device. In particular embodiments, the configuration data identifies a characteristic of the mobile device. At step 102, a computing system of the social-networking system determines a group of users of the social-networking system based at least in part on the configuration data. In particular embodiments, each user in the group of users uses a mobile device having similar configuration data as the mobile device of the user. At step 104, a computing system of the social-networking system provides user-assistance information associated with the group of users to the user, at which point the method may end. In particular embodiments, the user-assistance information is part of a NUX of the social-networking system. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components carrying out particular steps of the method of FIG. 2, this disclosure contemplates any suitable combination of any suitable components carrying out any suitable steps of the method of FIG. 2.

Figure 3:
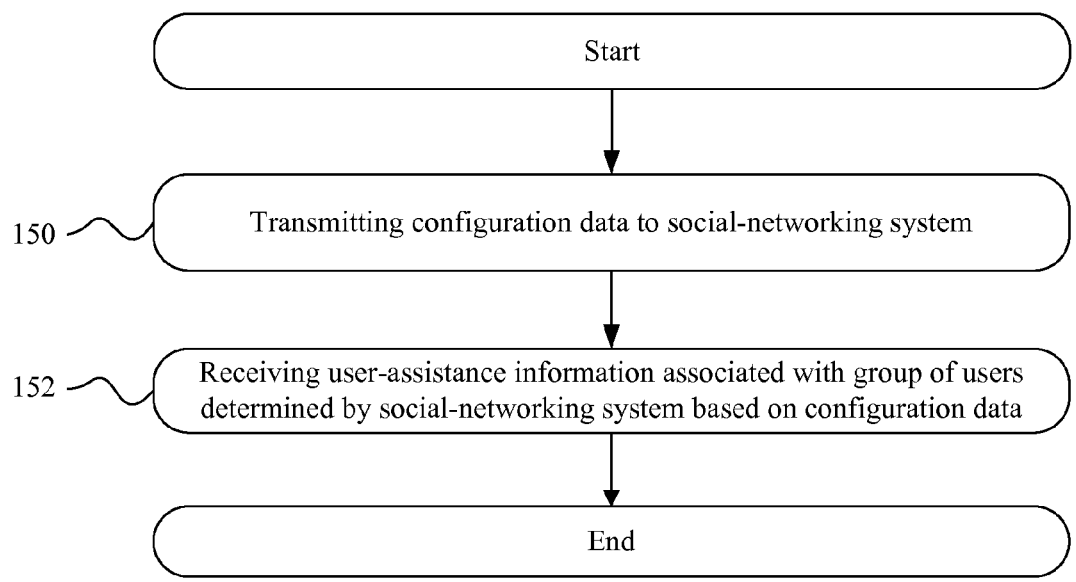
FIG. 3 illustrates an example method for for receiving user-assistance information on a mobile device.

FIG. 3 illustrates an example method for receiving user-assistance information on a mobile device. The method may start at step 150, where a mobile device of a user transmits configuration data to a computing system of a social-networking system. In particular embodiments, the configuration data identifies a characteristic of the mobile device. At step 152, the mobile device receives user-assistance information associated with a group of users determined by a computing system of the social-networking system based at least in part on the configuration data, at which point the method may end. In particular embodiments, each user in the group of users uses a mobile device having similar configuration data as the mobile device of the user. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components carrying out particular steps of the method of FIG. 3, this disclosure contemplates any suitable combination of any suitable components carrying out any suitable steps of the method of FIG. 3.

Figure 4:
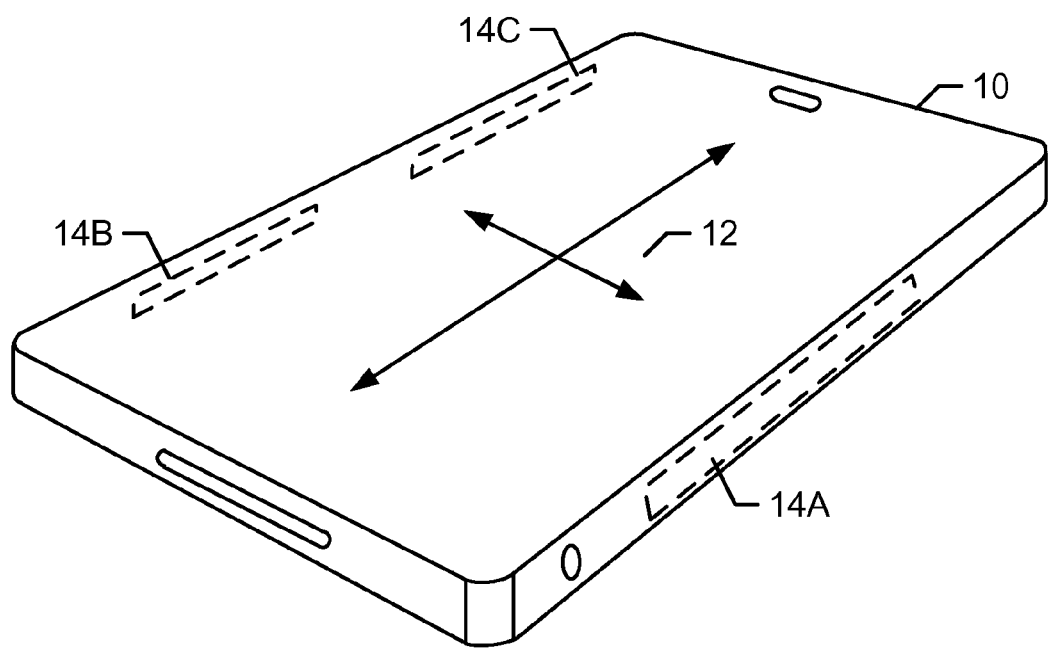
FIG. 4 illustrates an example mobile device.
Figure 5:
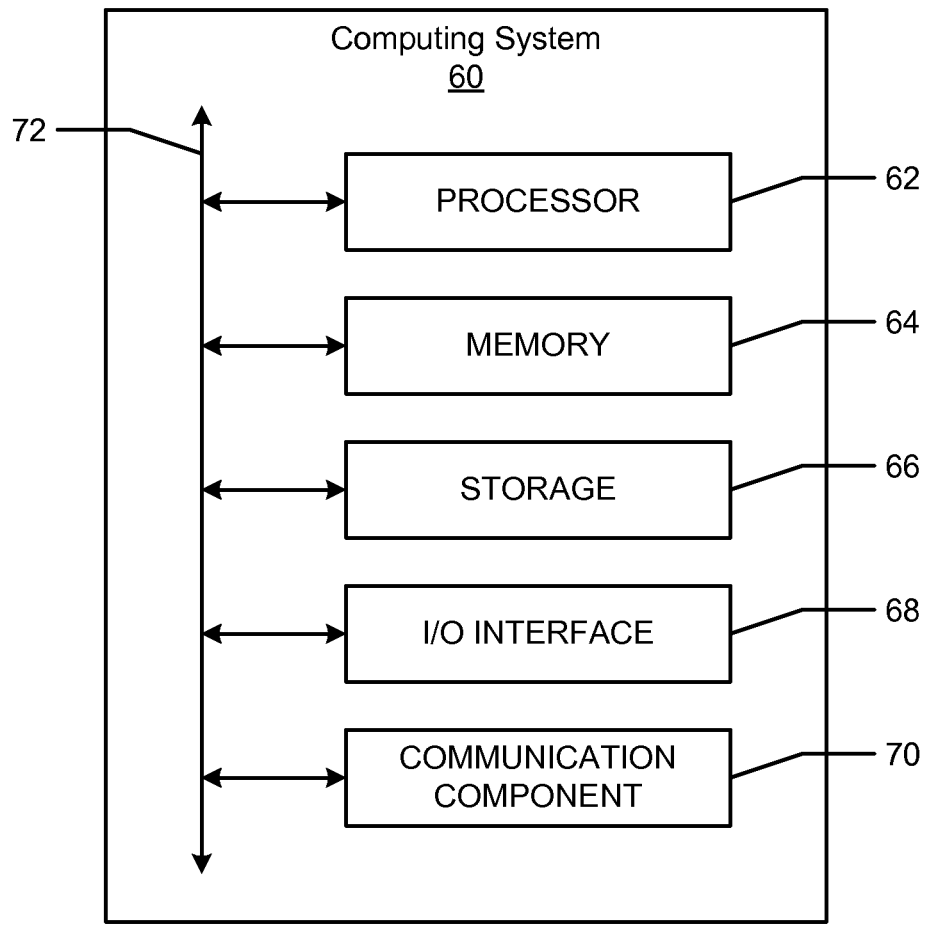
FIG. 5 illustrates an example computing system.

FIG. 4 illustrates an example mobile device. This disclosure contemplates mobile device 10 taking any suitable physical form. In particular embodiments, mobile device 10 may be a computing system as described below. As example and not by way of limitation, mobile device 10 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile device 10 may have a touch screen 12 as an input component. In the example of FIG. 5, touch screen 12 is incorporated on a front surface of mobile device 10. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 4, one or more antennae 14A-B may be incorporated into one or more sides of mobile device 10. Antennae 14A-B are components that convert electric current into radio waves, and vice versa. During transmission of signals, a transmitter applies an oscillating radio frequency (RF) electric current to terminals of antenna 14A-B, and antenna 14A-B radiates the energy of the applied the current as electromagnetic (EM) waves. During reception of signals, antennae 14A-B convert the power of an incoming EM wave into a voltage at the terminals of antennae 14A-B. The voltage may be transmitted to a receiver for amplification.

FIG. 5 illustrates example computing system. Where appropriate, one or more computing systems 60 may perform without substantial spatial or temporal limitation one or more steps of one or more methods described or illustrated herein. As an example and not by way of limitation, one or more computing systems 60 may perform in real time or in batch mode one or more steps of one or more methods described or illustrated herein. In particular embodiments, one or more computing systems 60 performs one or more steps of one or more methods described or illustrated herein. In particular embodiments, one or more computing systems 60 provides functionality described or illustrated herein. In particular embodiments, software running on one or more computing systems 60 performs one or more steps of one or more methods described or illustrated herein or provides functionality described or illustrated herein. Particular embodiments include one or more portions of one or more computing systems 60.

In particular embodiments, computing system 60 includes a processor 62, memory 64, storage 66, an input/output (I/O) interface 68, a communication component 70, and a bus 72. Although this disclosure describes and illustrates a particular mobile device having a particular number of particular components in a particular arrangement, this disclosure contemplates any suitable mobile device having any suitable number of any suitable components in any suitable arrangement. In particular embodiments, processor 62 includes hardware for executing instructions, such as those making up a computer program or application. As an example and not by way of limitation, to execute instructions, processor 62 may retrieve (or fetch) the instructions from an internal register, an internal cache, memory 64, or storage 66; decode and execute them; and then write one or more results to an internal register, an internal cache, memory 64, or storage 66.

In particular embodiments, processor 62 may include one or more internal caches for data, instructions, or addresses. This disclosure contemplates processor 62 including any suitable number of any suitable internal caches, where appropriate. As an example and not by way of limitation, processor 62 may include one or more instruction caches, one or more data caches, and one or more translation lookaside buffers (TLBs). Instructions in the instruction caches may be copies of instructions in memory 64 or storage 66, and the instruction caches may speed up retrieval of those instructions by processor 62. Data in the data caches may be copies of data in memory 64 or storage 66 for instructions executing at processor 62 to operate on; the results of previous instructions executed at processor 62 for access by subsequent instructions executing at processor 62 or for writing to memory 64 or storage 66; or other suitable data. The data caches may speed up read or write operations by processor 62. The TLBs may speed up virtual-address translation for processor 62. In particular embodiments, processor 62 may include one or more internal registers for data, instructions, or addresses. This disclosure contemplates a processor 62 including any suitable number of any suitable internal registers, where appropriate. Where appropriate, processor 16 may include one or more arithmetic logic units (ALUs); be a multi-core processor; or include one or more processors. Although this disclosure describes and illustrates a particular processor, this disclosure contemplates any suitable processor.

In particular embodiments, software executed by processor 62 may include an operating system (OS). The OS may include a kernel or any number of device drivers corresponding to one or more hardware components of mobile device 10. As an example and not by limitation, if computing system 60 is a smartphone, then the OS may be a mobile operating system, such as for example, WINDOWS Phone, ANDROID, SYMBIAN, IOS, or BADA. In particular embodiments, one or more software applications may be executed on computing device 60. In particular embodiments, the applications may be native applications installed and residing on computing system 60. As an example and not by way of limitation, an application (e.g. GOOGLE MAPS) may display a map on a display, search for addresses and businesses, or provide directions to a geographic location; a second application may provide remote access to email; a third application (i.e. a web browser) may enable a user to browse and search the Internet; a fourth application may control a camera to take photos or record videos; and a fifth application may allow the user to receive and initiate voice-over Internet Protocol (VoIP) or cellular network calls. The software applications may have a user interface (UI) and may implement one or more specific functionalities. The software applications may include one or more software modules implementing the specific functionalities. The executable code of the software applications may be stored in memory 64 or storage 66 of computing system 60.

In particular embodiments, memory 64 includes main memory for storing instructions for processor 62 to execute or data for processor 62 to operate on. As an example and not by way of limitation, computing system 60 may load instructions from storage 66 or another source (such as, for example, another computing system 60) to memory 64. Processor 62 may then load the instructions from memory 64 to an internal register or internal cache. To execute the instructions, processor 62 may retrieve the instructions from the internal register or internal cache and decode them. During or after execution of the instructions, processor 62 may write one or more results (which may be intermediate or final results) to the internal register or internal cache. Processor 62 may then write one or more of those results to memory 64. In particular embodiments, processor 62 executes only instructions in one or more internal registers or internal caches or in memory 64 (as opposed to storage 66 or elsewhere) and operates only on data in one or more internal registers or internal caches or in memory 64 (as opposed to storage 66 or elsewhere).

One or more memory buses (which may each include an address bus and a data bus) may couple processor 62 to memory 64. Bus 72 may include one or more memory buses, as described below. In particular embodiments, one or more memory management units (MMUs) reside between processor 62 and memory 64 and facilitate accesses to memory 64 requested by processor 62. In particular embodiments, memory 64 includes random-access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 64 may include one or more memories, where appropriate. Although this disclosure describes and illustrates particular memory, this disclosure contemplates any suitable memory.

In particular embodiments, storage 66 includes mass storage for data or instructions. As an example and not by way of limitation, storage 66 may include a hard-disk drive (HDD), a floppy disk drive, flash memory, or a combination of two or more of these. Storage 66 may include removable or non-removable (or fixed) media, where appropriate. Storage 66 may be internal or external to computing system 60, where appropriate. In particular embodiments, storage 66 is non-volatile, solid-state memory. In particular embodiments, storage 66 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 66 taking any suitable physical form. Storage 66 may include one or more storage control units facilitating communication between processor 62 and storage 66, where appropriate. Where appropriate, storage 66 may include one or more storages 66. Although this disclosure describes and illustrates particular storage, this disclosure contemplates any suitable storage.

In particular embodiments, I/O interface 68 includes hardware, software, or both providing one or more interfaces for communication between computing system 60 and one or more I/O devices. Computing system 60 may include one or more of these I/O devices, where appropriate. One or more of these I/O devices may enable communication between a user and computing system 60. As an example and not by way of limitation, an I/O device may include a keyboard, keypad, one or more sensors, touch screen, microphone, monitor, mouse, printer, scanner, speaker, digital still camera, stylus, trackball, video camera, another suitable I/O device or a combination of two or more of these. This disclosure contemplates any suitable I/O devices and any suitable I/O interfaces 68 for them. Where appropriate, I/O interface 68 may include one or more device or software drivers enabling processor 62 to drive one or more of these I/O devices. I/O interface 68 may include one or more I/O interfaces 68, where appropriate. Although this disclosure describes and illustrates a particular I/O interface, this disclosure contemplates any suitable I/O interface.

In particular embodiments, communication component 70 includes hardware, software, or both providing one or more interfaces for communication (such as, for example, packet-based communication) between computing system 70 and one or more other computing systems 60 or one or more networks. As an example and not by way of limitation, communication component 70 may include a network interface controller (NIC) or network adapter for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component 70 for it. As an example and not by way of limitation, computing system 60 may communicate with an ad hoc network, a personal area network (PAN), a LAN, a WAN, a MAN, or one or more portions of the Internet or a combination of two or more of these. One or more portions of one or more of these networks may be wired or wireless. As another example, computing system 60 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Computing system 60 may include any suitable communication component for any of these networks, where appropriate. Communication component 70 may include one or more communication components, where appropriate. Although this disclosure describes and illustrates a particular communication component, this disclosure contemplates any suitable communication component.

In particular embodiments, bus 72 includes hardware, software, or both coupling components of mobile device 10 to each other. As an example and not by way of limitation, bus 72 may include a graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a serial advanced technology attachment (SATA) bus, a Video Electronics Standards Association local (VLB) bus, or another suitable bus or a combination of two or more of these. Bus 72 may include one or more buses 72, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:
1. A method comprising:
by one or more computing systems of a social-networking system, receiving from a mobile device of a user configuration data of the mobile device, the configuration data identifying one or more characteristics of the mobile device;

by the one or more computing systems of the social-networking system, identifying a group of users of the social-networking system based at least in part on the configuration data identifying the one or more characteristics of the mobile device and analyzing a social graph, stored on the social-networking system, for users that each use a mobile device having similar configuration data as the mobile device of the user, each user in the group of users using a mobile device having similar characteristics as the one or more characteristics of the mobile device of the user;

by the one or more computing systems of the social-networking system, determining content of user-assistance information for the user based at least in part on historical activity of the identified group of users using a respective mobile device with one or more of the characteristics of the mobile device of the user, wherein the user-assistance information comprises information explaining a use of one or more features of the social-networking system for the mobile device with one or more of the identified characteristics; and by the one or more computing systems of the social-networking system, providing at least a portion of the user-assistance information to the user.

2. The method of claim 1, wherein the portion of the user-assistance information comprises information of one or more of the features of the social-networking system for a mobile device of a particular manufacturer, a particular model of the mobile device, a particular operating system (OS), or a particular version of the OS.

3. The method of claim 1, further comprising determining content of the user-assistance information based at least in part on the configuration data.

4. The method of claim 3, further comprising refining the content of the user-assistance information based at least in part on connections of a social graph of the user.

5. The method of claim 1, wherein the user-assistance information further comprises a profile image of one or more users in the group of users, one or more questions submitted by users of the group, one or more tips associated with using the social-networking system, or one or more tutorials on features of the social-networking system using the mobile device.

6. The method of claim 1, wherein providing the user-assistance information comprises providing the user-assistance information to the mobile device of the user.

7. One or more computer-readable non-transitory storage media embodying logic configured when executed to:

receive from a mobile device of a user configuration data of the mobile device, the configuration data identifying one or more characteristics of the mobile device;

identify a group of users of the social-networking system based at least in part on the configuration data identifying the one or more characteristics of the mobile device and analyzing a social graph, stored on the social-networking system, for users that each use a mobile device having similar configuration data as the mobile device of the user, each user in the group of users using a mobile device having similar characteristics as the one or more characteristics of the mobile device of the user;

determine content of user-assistance information for the user based at least in part on historical activity of the identified group of users using a respective mobile device with one or more of the characteristics of the mobile device of the user, wherein the user-assistance information comprises information explaining a use of one or more features of the social-networking system for the mobile device with one or more of the identified characteristics; and provide at least a portion of the user-assistance information to the user.

8. The media of claim 7, wherein the portion of the user-assistance information comprises information of one or more of the features of the social-networking system for a mobile device of a particular manufacturer, a particular model of the mobile device, a particular operating system (OS), or a particular version of the OS.

9. The media of claim 7, wherein the logic is further configured to determine content of the user-assistance information based at least in part on the configuration data.

10. The media of claim 9, wherein the logic is further configured to refine the content of the user-assistance information based at least in part on connections of a social graph of the user.

11. The media of claim 7, wherein the user-assistance information further comprises a profile image of one or more users in the group of users, one or more questions submitted by users of the group, one or more tips associated with using the social-networking system, or one or more tutorials on features of the social-networking system using the mobile device.

12. The media of claim 7, wherein the logic is further configured to provide the user-assistance information to the mobile device of the user.

13. A method comprising:

by a mobile device of a user, transmitting configuration data to one or more computing systems of a social-networking system, the configuration data identifying one or more characteristics of the mobile device; and by the mobile device, receiving user-assistance information whose content is based at least in part on historical activity of a group of users using a respective mobile device with one or more of the characteristics of the mobile device of the user, wherein the user-assistance information comprises information explaining a use of one or more features of the social-networking system for the mobile device with one or more of the identified characteristics, the group of users being identified based at least in part on the configuration data identifying the one or more characteristics of the mobile device and analyzing a social graph, stored on the social-networking system, for users that each use a mobile device having similar configuration data as the mobile device of the user, each user in the group of users using a mobile device having similar characteristics as the one or more characteristics of the mobile device of the user.

14. The method of claim 13, wherein the user-assistance information comprises information of one or more of the features of the social-networking system for a mobile device of a particular manufacturer, a particular model of the mobile device, a particular operating system (OS), or a particular version of the OS.

15. The method of claim 13, wherein content of the user-assistance information is further based at least in part on the configuration data.

16. The method of claim 15, wherein the content of the user-assistance information is further based at least in part on connections of a social graph of the user.

17. The method of claim 13, wherein the user-assistance information further comprises a profile image of one or more users in the group of users, one or more questions submitted by users of the group, one or more tips associated with using the social-networking system, or one or more tutorials on features of the social-networking system using the mobile device.

\* \* \* \* \*